(12) United States Patent
Mizushima et al.

(10) Patent No.: US 7,281,101 B2
(45) Date of Patent: Oct. 9, 2007

(54) MEMORY DEVICE STORING DATA RELATING TO SPECIFIC APPLICATION PROGRAMS

(75) Inventors: Nagamasa Mizushima, Fujisawa (JP); Motoyasu Tsunoda, Sagamihara (JP); Kunihiro Katayama, Chigasaki (JP)

(73) Assignee: Renesas Technology Corp., Tokyo (JP)

( * ) Notice: Subject to any disclaimer, the term of this patent is extended or adjusted under 35 U.S.C. 154(b) by 480 days.

(21) Appl. No.: 10/776,962

(22) Filed: Feb. 10, 2004

(65) Prior Publication Data

US 2004/0162932 A1     Aug. 19, 2004

(30) Foreign Application Priority Data

Feb. 6, 2003   (JP)   ............... 2003-028998
Feb. 27, 2003  (JP)   ............... 2003-050243

(51) Int. Cl.
  *G06F 12/14*   (2006.01)
(52) U.S. Cl. ..................... 711/163; 711/152
(58) Field of Classification Search ............ None
  See application file for complete search history.

(56) References Cited

U.S. PATENT DOCUMENTS 6,003,113 A * 12/1999 Hoshino ............... 711/106
6,745,944 B2 * 6/2004 Dell ..................... 235/492
6,776,346 B1 * 8/2004 Sonzogni et al. ........ 235/492

FOREIGN PATENT DOCUMENTS

| JP | 06-222980   | 8/1994 |
| JP | 10-198776   | 7/1998 |
| JP | 2000-066882 | 3/2000 |

* cited by examiner

*Primary Examiner*—T Nguyen
(74) *Attorney, Agent, or Firm*—Townsend and Townsend and Crew LLP (57) ABSTRACT

In one aspect of the present invention, a memory device comprises an interface which interfaces with an external device, an IC chip which stores one or more application programs and executes the application programs, a memory which stores associated data associated with the one or more application programs, and a controller connected with the interface, the IC chip, and the memory. In response to a predetermined command received from the external device by way of the interface, the controller performs transfer of the associated data between the IC chip and the memory without passing the associated data to the host device during transfer of the associated data between the IC chip and the memory.

24 Claims, 5 Drawing Sheets

MEMORY DEVICE STORING DATA RELATING TO SPECIFIC APPLICATION PROGRAMS

CROSS-REFERENCES TO RELATED APPLICATIONS

This application relates to and claims priority from Japanese Patent Application Nos. 2003-050243, filed on Feb. 27, 2003, and 2003-028998, filed on Feb. 6, 2003, the entire disclosures of which are incorporated herein by reference.

BACKGROUND OF THE INVENTION

The present invention relates to a storage device equipped with security functions, a host device into which the storage device can be inserted, and a host device equipped with the storage device. More specifically, the present invention relates to a memory card or the like equipped with a flash memory chip, a controller chip, and an IC card chip.

JP-A-10-198776 discloses a memory card equipped with an IC module and a high-capacity flash memory.

In JP-A-2000-66882, execution conditions for individual application programs are stored in an IC card. When there is a processing request, an application is executed if the execution conditions are met. The application cannot be executed if the conditions are not met.

In JP-A-6-222980, memory regions are set up in an IC card so that a region A is assigned for banks and a region B is assigned for hospitals.

None of these conventional technologies describe assigning a separate memory area for each individual application program in an IC card. Thus, with the conventional technologies, there is the possibility that application programs may improperly corrupt each others' data in the memory.

BRIEF SUMMARY OF THE INVENTION

Embodiments of the present invention provide a memory device that improves security for operations relating to specific application programs by having the data relating to the specific application program handled within the memory device when an operation relating to the specific application is executed. A storage medium is provided to prevent data interference between application programs in the IC card chip or IC chip, i.e., prevent memory assigned to one application program from being accessed and corrupted by another application program.

In accordance with one aspect of the present invention, a memory device comprises an interface which interfaces with an external device, an IC chip which stores one or more application programs and executes the application programs, a memory which stores associated data associated with the one or more application programs, and a controller connected with the interface, the IC chip, and the memory. In response to a predetermined command received from the external device by way of the interface, the controller performs transfer of the associated data between the IC chip and the memory without passing the associated data to the host device during transfer of the associated data between the IC chip and the memory.

According to another aspect of the present invention, a memory device comprises an IC chip which executes one or more application programs, and a memory divided into a plurality of blocks. Each block is assigned to an application program executed by the IC chip. A controller controls access to the memory and the IC chip. The memory stores one or more command codes used to allow the controller to query the IC chip regarding an instruction to perform an operation. The instruction is issued by the IC chip to the controller. Each command code is associated with an application ID for identifying an application program. In response to an application ID associated with an application program, the application ID being sent by the IC chip to the controller for executing the application program, the controller identifies, out of the one or more command codes stored in the memory, a command code associated with the application ID from the IC chip and sends the identified command code to the IC chip. In response to an instruction to perform an operation issued by the IC chip to the controller based on the identified command code, the controller performs the operation.

According to another aspect of the present invention, a memory device comprises an IC chip which executes one or more application programs, and a memory divided into a plurality of blocks. Each block is assigned to an application program executed by the IC chip. In response to a first command from an external device, the controller assigns a usage privilege for a block in the memory to a particular application program to be executed by the IC chip. In response to a second command from the external device, the controller changes from an unlocked state allowing execution of an operation in response to the first command to a locked state disallowing execution of the operation in response to the first command.

In addition, when operations for a predetermined application program are executed, data associated with the predetermined application program are processed within the memory device so that safety of the operations associated with the predetermined application program can be improved. Further, a different memory block in the memory device is assigned to each application program to be executed by the memory device. This prevents data interference between application programs, i.e., memory assigned to one application program is prevented from being corrupted by data access from another application program.

In accordance with another aspect of the invention, a memory device comprising an interface which interfaces with an external device and a memory which includes at least seven terminals, wherein the interface is configured to perform the following: receiving a lock command from the external device, the lock command setting the memory to a locked states; receiving a read command from the external device to read from the memory; and sending a response rejecting the read command to the external device when the memory is in the locked state. In specific embodiments, the interface further is configured to perform the following: receiving an unlock command from the external device, the unlock command setting the memory to an unlocked state; receiving a read command from the external device to read from the memory; and sending data read from the memory to the external device.

DETAILED DESCRIPTION OF THE INVENTION

Figure 1:
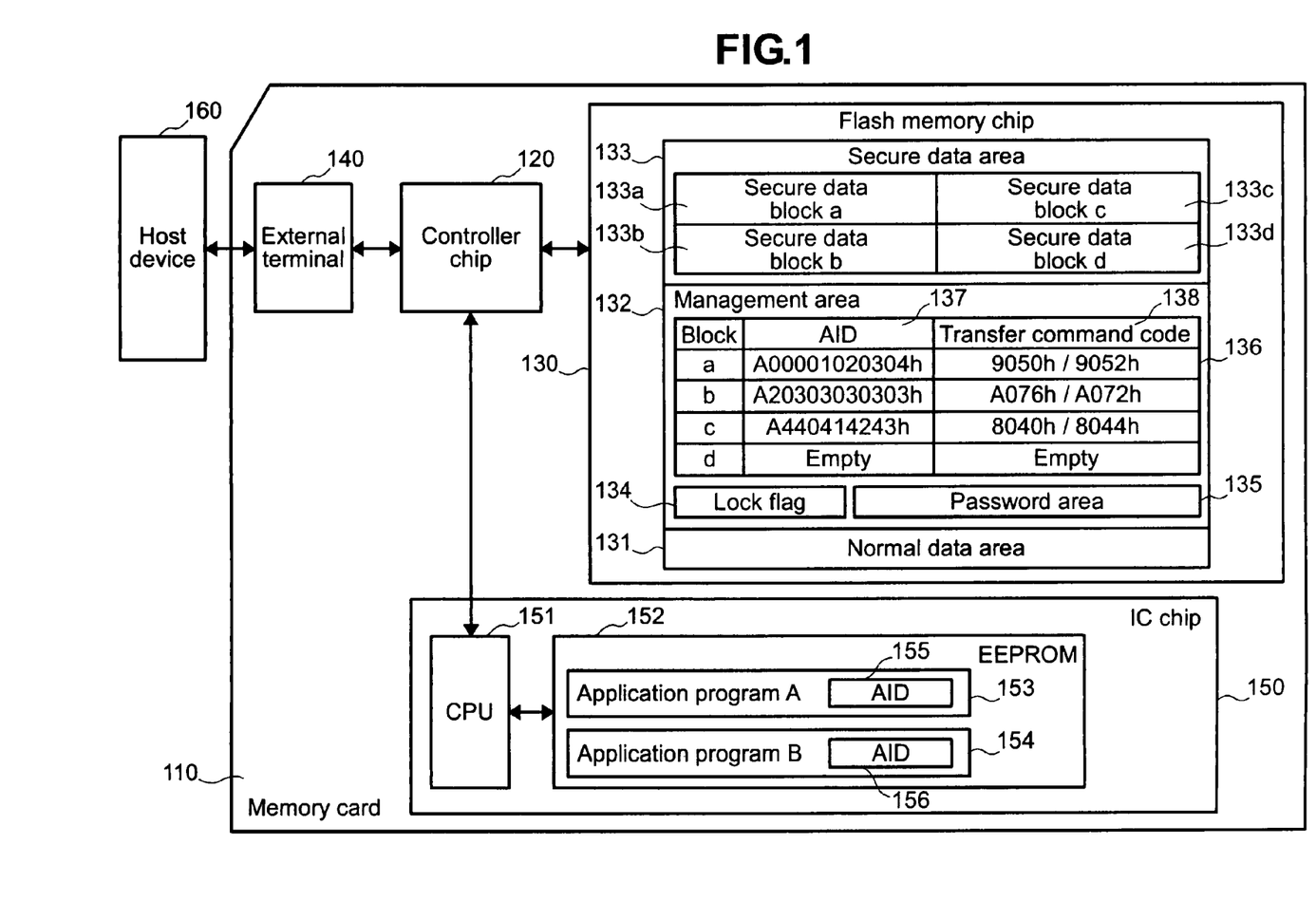
FIG. 1 shows the internal architecture of a memory card according to an embodiment of the present invention.

FIG. 1 shows a simplified drawing of the internal architecture of a memory card in which an embodiment of the present invention is implemented. An externally connected host device 160 issues memory card commands according to the MultiMediaCard protocol specifications to a memory card 110, which is equipped with a storage function that allows reading and writing of file data and a security processing function that performs encryption operations needed for secure data protection, personal authentication, and the like. The host device 160 can be a portable telephone, a portable information terminal (PDA), a personal computer, a music playback (and recording) device, a camera, a video camera, an automated teller machine, a streetcorner terminal, a payment terminal, or the like. The memory card 110 is equipped with an external terminal 140, a controller chip 120, a flash memory chip 130, and an IC chip 150. The flash memory chip 130 is a high-capacity (e.g., 64 megabyte) memory chip that uses non-volatile semiconductor memory as a storage medium. The flash memory chip 130 can be made to read and write data using flash memory commands. The external terminal 140 is used for exchanging information with the external host device 160 and is formed from seven terminals: a power supply terminal; a clock input terminal; a command input/output terminal; a data input/output terminal; and a ground terminal. The controller chip 120 is a microprocessor chip connected to the other elements in the memory card 110 (the external terminal 140, the flash memory chip 130, the IC chip 150) and controls these elements. The external terminal, the electric signal protocol, and commands of the IC chip 150, which is a microprocessor chip for embedding in a plastic substrate, are based on the ISO/IEC 7816 specifications. The external terminal of the IC chip 150 includes a power supply terminal, a clock input terminal, a reset input terminal, an I/O input/output terminal, and a ground terminal. The external terminals of the IC chip 150, with the exception of the ground terminal, (i.e., the power supply terminal, the clock input terminal, the reset input terminal, and the I/O input/output terminal) are connected to the controller chip 120. The controller chip 120 issues IC card commands to the IC chip 150 from the external terminals of the IC chip 150 in order to perform operations needed for security processing requested by the external host device 160. The IC chip 150 is equipped with a CPU 151 for performing calculations and an EEPROM (Electronically Erasable Programmable Read-Only Memory) 152. The flash memory chip 130 is equipped with a storage element but not a microprocessor. While a multimedia card has seven terminals, other memory cards have different numbers of terminals. For example, an SD (secure digital) card has nine terminals, and a mini-SD card has eleven terminals.

Security processing is executed by the CPU 151 when data is written to the EEPROM 152 in the IC chip 150, when data is read from the EEPROM 152, or the like. The details of the security processing are contained in the program code stored in the EEPROM 152. The program code is structured as modules serving different functions so that various types of security processing can be used. The CPU 151 can switch between different security processing modules as necessary. For example, the EEPROM 152 can store an application program A 153 and an application program B 154. Each application program in the IC card has its own application identifier (hereinafter referred to as AID (Application Identifier)). In FIG. 1, the application program A 153 has an AID of 155 and the application program B 154 has an AID of 156. It would be preferable for these AIDs to be unique values assigned internationally to allow identification of IC card application programs. A method for assigning international AIDs is defined in ISO/IEC 7816-5. The storage capacity of the EEPROM 152 is smaller than the storage capacity of the flash memory chip 130, e.g., 64 kilobytes. However, the present invention can also be implemented so that the storage capacity of the EEPROM 152 is the same or greater than the storage capacity of the flash memory chip 130.

A product that has been certified by an evaluation/certification body for ISO/IEC 15408, which is an international security evaluation standard, is used for the IC chip 150. To actually use an IC card with security processing functions in an electronic payment service, the IC card must be evaluated and certified by an ISO/IEC 15408 evaluation/certification body. If security processing functions are added to the memory card 110 for use in an actual electronic payment service, the memory card 110 must also be evaluated and certified by an ISO/IEC 15408 evaluation/certification body. The memory card 110 is equipped internally with the IC chip 150 that has been certified by the evaluation/certification body, and the IC chip 150 is used to perform security processing, thus providing security processing functions. This allows the memory card 110 to easily comply with security evaluation standards based on the ISO/IEC 15408, and the development time required to add security processing functions to the memory card 110 can be reduced.

It would be preferable for the memory card 110 to be equipped with an external interface that complies with the MultiMediaCard specifications. The memory card 110 could then receive, via a single type of external interface, standard memory commands based on the MultiMediaCard specifications as well as commands for executing security operations (hereinafter referred to as secure write commands). Secure write commands are accompanied by input data. The controller chip 120 assigns command processing operations by selecting a chip to be accessed depending on whether the command received by the memory card 110 is a standard memory card command or a secure write command. If a standard memory command is received, the flash memory chip 130 is selected so that flash memory commands can be issued to read and write host data. If a secure write command is received, the IC chip 150 is selected so that IC card commands can be issued to execute security operations. The IC card commands issued here are embedded in the data received by the secure write command (hereinafter referred to as secure write data). The IC chip 150 responds to the command with an IC card response, which the controller chip 120 caches. The memory card 110 also receives a command for reading the results of the security operation (hereinafter referred to as a secure read command) via the single type of external interface. The secure read command is accompanied by output data. If a secure read command is received, data, including the cached IC card response, is outputted (hereinafter referred to as secure read data).

Figure 2:
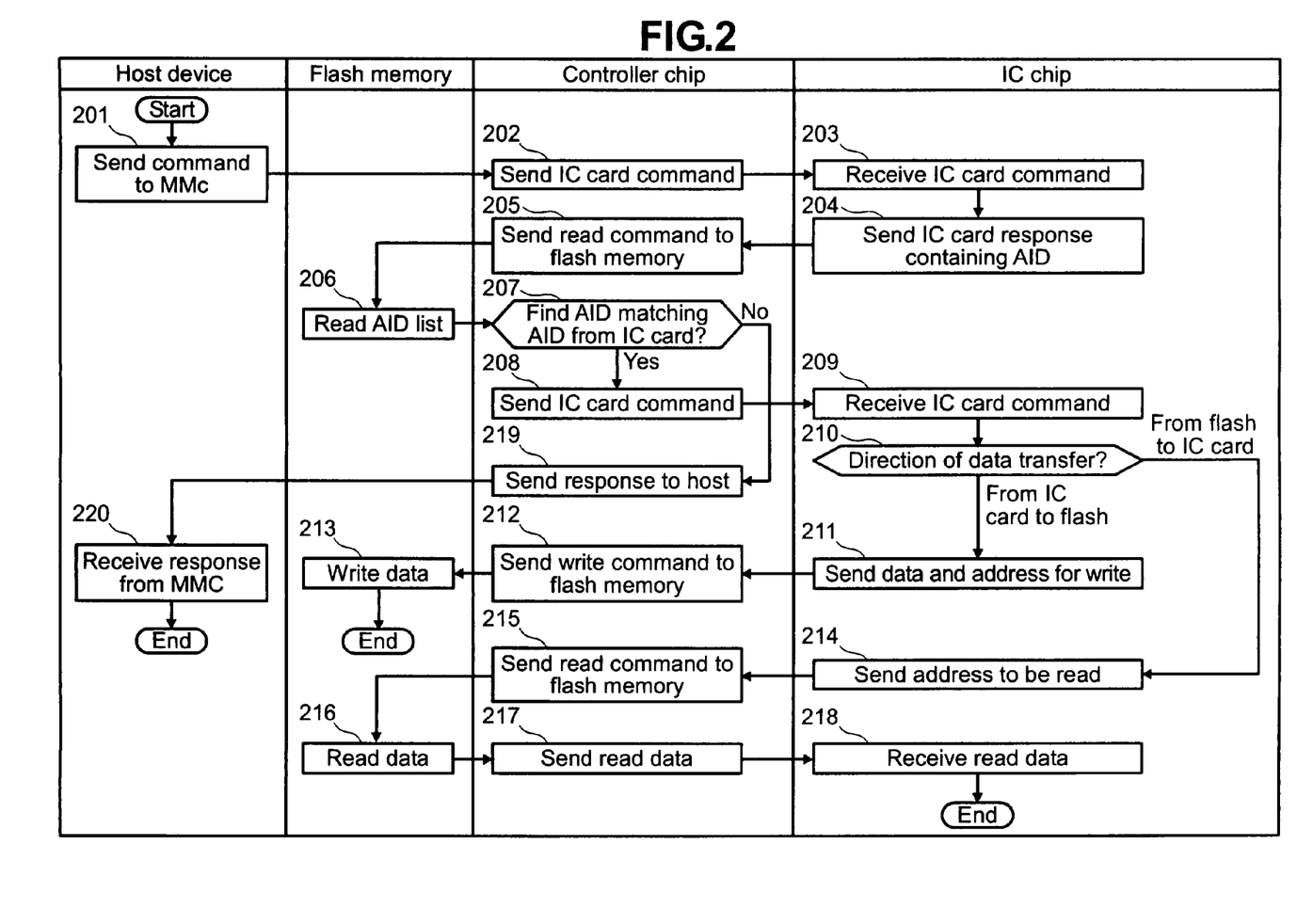
FIG. 2 is a flowchart showing an overview of the operations performed by a memory card according to an embodiment of the present invention.

FIG. 2 is a flowchart showing an overview of the operations performed by the memory card 110 according to an embodiment of the present invention. These operations will be described with reference to FIG. 2. When the host device 160 sends a secure write command to the memory card 110 (201), the controller chip 120 sends an IC card command to the IC chip 150 (202). The IC chip 150 receives the IC card command (203), and responds by sending the controller chip 120 an IC card response that includes the AID of the application program selected at the time (204). When the controller chip 120 receives the IC card response, a read command is sent to the flash memory chip 130 (205). As a result, the flash memory chip 130 reads the AID list (written ahead of time) (206) and outputs the list to the controller chip 120. The controller chip 120 searches the list for an entry with an AID that matches the one from the IC chip 150 (207). If no matching AID is found, a secure read command is received from the host device 160 and an IC card response is sent as secure read data (219) which is received by the host device 160 (220). If an AID is found at step 207, the sending of IC card responses to the host device 160 is blocked, and an IC card command is sent to the IC chip 150 (208). When the IC chip 150 receives the IC card command (209), an IC card response based on a data transfer direction is generated since the selected application program needs to transfer data between the IC chip 150 and the flash memory chip 130 (210). If data is to be transferred from the IC card to the flash memory, an IC card response containing the data to be written to the flash memory along with an address for the write is generated and sent (211). If data is to be transferred from the flash to the IC card, an IC card response containing a flash memory address to be read from is generated and sent (214). After step 211, the controller chip 120 sends a write command to the flash memory chip 130 (212). In response, the flash memory chip 130 writes data to the specified address (213). This completes the transfer of data from the IC card to the flash memory. After step 214, the controller chip 120 sends a read command to the flash memory chip 130 (215). In response, the flash memory chip 130 reads data from the specified address (216), and sends the result to the controller chip 120. The controller chip 120 issues an IC card command to send the read data to the IC chip 150 (217), and this data is received by the IC chip 150 (218). This completes the transfer of data from the flash memory to the IC card.

Figure 6:
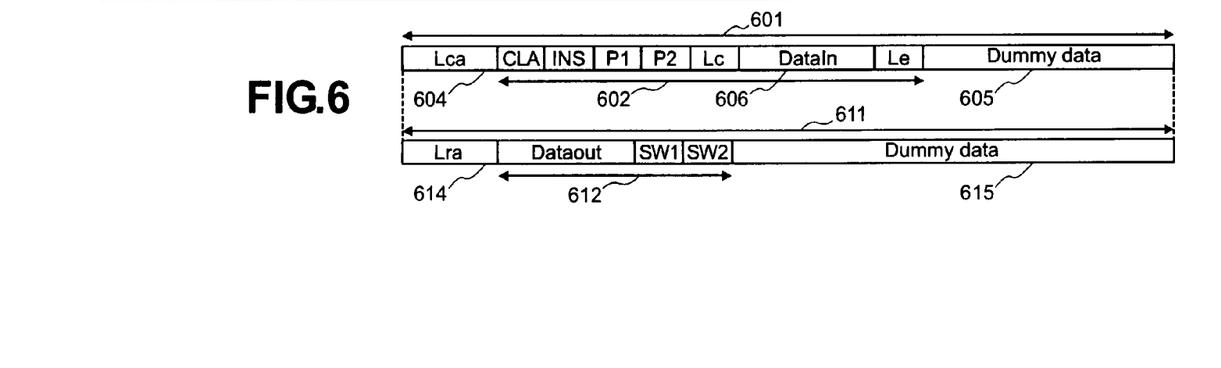
FIG. 6 is a drawing showing the structure of secure write data and secure read data.

FIG. 6 shows a sample format for secure write data and secure read data. It would be preferable for this format to allow the contents of the security operations to be executed to be expressed with a single IC card command, and to allow the results of the security operations to be expressed with a single IC card response. As described above, the IC card command sent to the IC chip 150 and the IC card response received from the IC chip 150 are both compliant with the ISO/IEC 7816-4 specifications. According to these specifications, the IC card command structure must have a 4-byte header (class byte CLA, instruction byte INS, and parameter bytes P1 and P2). This is followed, as needed, by an input data length byte Lc, an input data field DataIn, and an output data length byte Le. The structure of the IC card response must have a status SW1 (status word 1) byte and a status SW2 (status word 2) byte. This is preceded, as needed, by an output data field DataOut. In a security write data 601 of this format, an IC card command length Lca 604 is added before an IC card command 602, and dummy data 605 serving as padding is added after the IC card command 602. The value of Lca 604 is the sum of the lengths of the elements in the IC card command 602. In secure read data 611, an IC card response length Lra 614 is added before an IC card response 612, and dummy data 615 is added after the IC card response 612 as padding. The value of Lra 614 is the total length of the elements in the IC card response 612. This figure shows an example of a format in which Lc, DataIn, and Le are included in the IC card command and DataOut is included in the IC card response. In data read/write command, specifications for standard memory card commands used for the memory card 110 are based on processing read/write access data in the form of fixed-length block units. Thus, it would be preferable for the security write data 601 and the security read data 611 to have identical block sizes based on the standard memory card command specifications used by the memory card 110. The dummy data 605, 615 are used so that the security write data 601 and the security read data 611 can match the block size. It would be preferable for the block size to be the FAT sector size (512 bytes) used in the logical file systems of standard compact memory cards. The dummy data 605, 615 padding can be all zeros, random numbers, or checksum values that can be used by the controller chip 120 and the host device 160 to detect and correct data errors. The value of the Lca 604 is used by the controller chip 120 to remove the dummy data 605 from the security write data 601 and extract the IC card command 602. The value of the Lra 614 is used by the host device 160 to remove the dummy data 615 from the secure read data 611 and extract the IC card response 612.

The controller chip 120 supplies power to the IC chip 150 and controls the clock line by way of the power supply terminal and the clock input terminal respectively. When no security operation is requested by the host device 160, the power and clock signal to the IC chip 150 can be stopped to reduce power consumption of the memory card 110.

When the IC chip 150 is not receiving power and it is to be put in a state where it can receive IC card commands, power must first be sent to the IC chip 150 and a reset must be performed. The controller chip 120 has a function in which power is sent by way of the power supply terminal to the IC chip 150 when a secure write command from the host device 160 is received by the memory card 110. The controller chip 120 also has a function in which a reset operation is performed for the IC chip 150 by way of the reset input terminal when a secure write command from the host device 160 is received by the memory card 110. The controller chip 120 can stop power to the IC chip 150 until a secure write command is received, thus reducing the power consumed by the memory card 110.

The controller chip 120 is equipped with a to generate a clock signal within the memory card 110 to be supplied to the IC chip 150 via the clock input terminal of the IC chip 150 and to control the frequency, the start timing, and the stop timing of the clock signal. Since this clock signal can be made independent of the clock signal at the clock input terminal of the external terminal 140, security is improved against attacks based on timing analysis, power differential analysis, and fault-based analysis.

The flash memory chip 130 includes a normal data area 131, a management area 132, and a secure data area 133.

In the normal data area 131, each sector is mapped to a logical address. The host device 160 can write data to a specified logical address by using a standard memory card command.

The secure data area 133 allows data to be saved when an application program stored in the EEPROM 152 of the IC chip 150 (e.g., the application program A 153 or the application program B 154) is executed by the CPU 151 (i.e., when a security operation is executed). The secure data area 133 is divided into multiple blocks. These are referred to as secure data blocks. For example, the secure data area 133 is divided into four secure data blocks: secure data blocks 133a, 133b, 133c, 133d. The secure data blocks are units to which the controller chip 120 can assign usage privileges for individual application programs. For example, the application program A 153 has usage privilege for the security data block c 133c. The security program B 154 has usage privilege for the security data block a 133a. Also, each security data block is divided into multiple fixed-length data records. Each record can be, for example, 128 bytes, and each secure data block can contain 8192 records. In this case, the size of a secure data block is 1 megabyte, and the capacity of the secure data area 133 is 4 megabytes. Thus, the application programs stored in the EEPROM 152 can access the data in the secure data area 133 to use non-volatile data that would exceed the capacity of the EEPROM 152. For example, if the application program A 153 in the IC chip 150 is a program that performs security processing for electronic transactions, the settlements log (payment amounts, time and dates, and the like) can be stored in the security data area 133 so that settlement logs that are larger than what would fit in just the EEPROM 152 could be used, improving usefulness for the user. Access (write and read access) from the IC chip 150 to the secure data area 133 is controlled by the controller chip 120 based on requests from the IC chip 150. The conditions for generating these requests are up to the application programs in the IC card, e.g., when the capacity of the EEPROM 152 drops to a particular threshold value or lower (and thus data has to be written externally), when data in the IC chip has a security reference value less than a particular value (and thus it is safe to write the data externally), or when requested data cannot be found in the EEPROM 152 (and thus the data must be read from outside the card). Details about accessing the secure data area 133 from the IC chip will be described later.

In the management area 132, the controller chip 120 stores information used to manage the secure data area 133. When a secure write command is received by the memory card 110 from the host device 160, the controller chip 120 performs operations in this area such as storing or deleting information. The associated commands will be described later. The management area 132 includes a lock flag 134, a password area 135, and a management table 136.

The management table 136 is used to register information about the application programs that have usage privileges in each secure data block of the secure data area 133. It would be preferable for the application program to be registered by storing its AID in this area to allow the application program to be identified. By using the AID, the application programs using the secure data area 133 can be reliably identified. The controller chip 120 blocks the same AID from being registered multiple times in the AID 137. The block field of the management table 136 stores the starting addresses of blocks to serve as block identifiers for identifying secure data blocks. Alternatively, it would also be possible to store numbers unique within the memory card 110 as block identifiers in place of starting addresses. It would also be possible to register AID information directly in each secure data block rather than in the management table 136.

In addition to the AID 137, the management table 136 can also store transfer command codes 138 for each application program. It would be preferable for the transfer command codes 138 to be generated by the controller chip 120 when the controller chip 120 assigns secure data block usage permissions to the application programs. The transfer command codes are 2×2 byte values set to the CLA byte and the INS byte of the command APDU (Application Protocol Data Unit) of the "write transfer command" and the "read transfer command". The "write transfer command" and the "read transfer command" refer to commands in the IC card command format issued by the controller chip 120 to the IC chip 150 so that record data is transferred between the controller chip 120 and the IC chip 150 either before record data is written to the secure data area 133 or after record data is read from the secure data area 133. More specifically, the command to send record data to the controller chip 120 is referred to as the write transfer command, and the command to send record data to the IC chip 150 is referred to as the read transfer command. These commands will be described in more detail later. The application program A 153 and the application program B 154, which have usage permission for the secure data area 133, include processing programs to handle record data when write/read transfer commands are received. The transfer command code 138 is defined independently for each application program. If transfer command codes were shared, fixed values for all the application programs, there could be coding conflicts between the write/read transfer commands and commands specific to application programs contained in secure write data from the host device 160. The present embodiment prevents this type of coding conflict. The INS code in the transfer command code 138 must conform to ISO/IEC 7816-3 because of the transfer protocol.

A lock flag 134 is an area for storing one byte indicating whether the registration information stored in the management table 136 can be changed. An FFh in this area indicates that changes to the information in the management table 136 are disabled (locked). A 00h indicates that changes to the information in the management table 136 are allowed (unlocked).

The password area 135 is an area for storing a 255-byte password reference value used to unlock the information in the management table 136. When the information in the management table 136 is locked, the host device 160 needs to issue a secure write command to store a 255-byte password reference in this area. To unlock the information in the management table 136, the host device 160 must issue a secure write command to enter the same password as the password reference that was set up during the locking operation. The information in the management table 136 can be unlocked if the entered password and the password reference match.

The controller chip 120 imposes physical access restrictions to the management area 132 to prevent the host device 160 from improperly accessing the area and analyzing security operations. More specifically, since the controller chip 120 does not assign a logical address to the management area 132, the host device 160 cannot directly read data. This improves the safety and reliability of the security operations implemented for the memory card 110.

The command APDU and the response APDU of write/read transfer commands used for write/read access of record data in the security data area 133 will be described, with reference to FIG. 3.

Figure 3A:
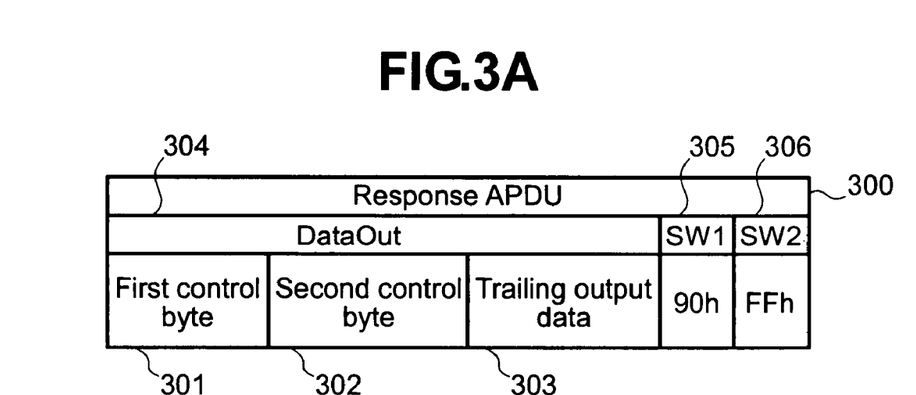
FIG. 3 is a drawing showing the structure of an IC card command and an IC card response transferred between a controller chip and an IC chip.

FIG. 3a shows a response APDU sent from the IC chip 150. The IC chip 150 is able to notify the controller chip 120 of a request to access the secure data area 133 by entering special values in the first two bytes (hereinafter referred to as a first control byte 301 and a second control byte 302) of the DataOut 304 in the response APDU 300 and in the SW1 byte 305 and the SW2 byte 306. Trailing output data 303 (the section of DataOut 304 excluding the first control byte 301 and the second control byte 302) is used to send information needed for the access request.

In order to request the controller chip 120 for access to the secure data area 133, the IC chip 150 will enter a dedicated status value, 90FFh, in the SW1 byte 305 and the SW2 byte 306. The controller chip 120 continuously monitors for a response APDU from the IC chip 150. If the SW1 byte 305 and the SW2 byte 306 are found to be 90FFh, the first control byte 301 and the second control byte 302 of the preceding DataOut 304 are analyzed to determined the nature of the requested access and the like. If the value is not 90FFh, secure read data including this response APDU is sent to the host device 160. In certain cases, the data may be sent directly to the host device 160 even if the SW1 byte 305 and the SW2 byte 306 are 90FFh. The details of this will be described later.

When access to the secure data area 133 is begun, the controller chip 120 selects a secure data block out of the secure data blocks 133a-133d for activation based on which application program is selected in the IC chip 150. The selection of the secure data block to be accessed is made immediately after a start access request is generated by the IC chip 150. The specifications for the data to be entered in DataOut 304 to request access initiation will be described. The 4 high-order bits of the first control byte 301 are set to 0001. The 4 low-order bits of the first control byte 301 are set to a code indicating the access mode. The access mode set up here can be a mode for writing record data or for reading record data. The code 0001 indicates writing of record data, and 0010 indicates reading of record data. Other codes are invalid. The AID of the application program selected in the IC chip 150 is entered in the trailing output data 303. For example, if the application program A 153 is selected, AID 155 is used, and if the application program B 154 is selected, AID 156 is used. The second control byte 302 sets the length of the AID.

If the 4 high-order bits of the first control byte are 0001, the controller chip 120 searches through all the AID entries 137 in the management table 136 for the AID in the trailing data 303 and sets all the secure data blocks to active. If no matching AID is found, secure read data containing the response APDU is sent to the host device 160. If the AID is found, the associated secure data block is determined and the controller chip 120 assumes that write access is to be started if the 4 low-order bits of the first control byte are 0001 and that read access is to be started if they are 0010. If the lower 4 bytes of the first control byte are another value, secure read data containing the response APDU is sent to the host device 160.

Figure 3B:
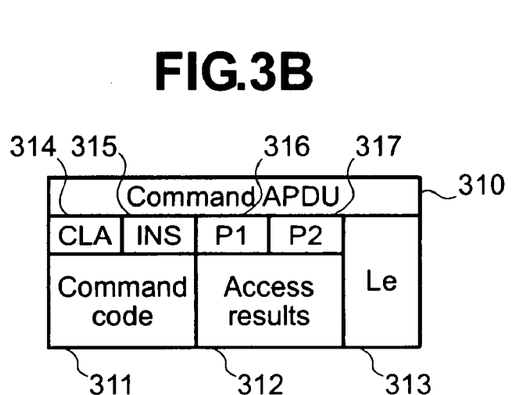
Figure 3C:
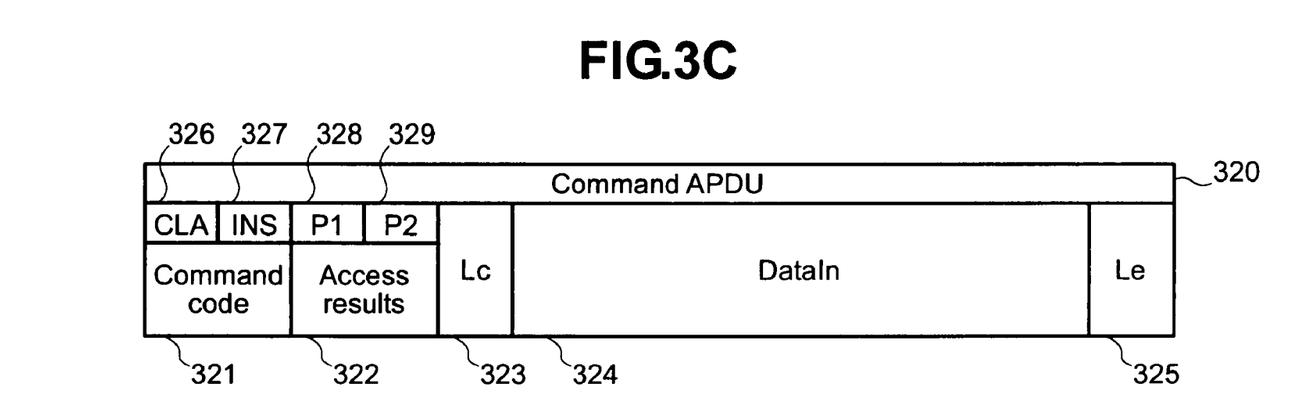

Once the controller chip 120 determines the access mode (write or read), a write/read transfer command based on this mode is issued so that record data to be written to or read from the active secure data block can be transferred between the IC chip 150 and the controller chip 120. FIG. 3b and FIG. 3c show command APDUs for write/read transfer commands. In FIG. 3b, there is no transfer data from the controller chip 120 to the IC chip 150. In FIG. 3c, there is transfer data. As described above, values set up specific to application programs are entered ahead of time in the CLA byte 314 (or 326) and the INS code 315 (or 327) of the command APDU 310 (or 320) for the write/read transfer command. To do this, a transfer command code 138, formed as two pairs of bytes, is read from the management table 136.

In the command APDU 310 (or 320) for a write/read transfer command, special values are entered in the P1 byte 316 (or 328) and the P2 byte 317 (or 329) in order to provide notification to the IC chip 150 of the results from the previous access. A value of 0000h indicates that there was no error in the previous access. A value of 80XXh indicates that an error took place in the previous access. XX is a hexadecimal code indicating the nature of the error. If there was an error, data access to the active security data block does not take place. Thus, the contents of the record data in the secure data block do not change.

The IC chip 150 uses the trailing output data 303 in the response APDU 300 of the write/read transfer command to send to the controller chip 120 the record number and record data to be written or the record number to be read. In write mode, the specified record number (4 bytes) and linked write data (128 bytes) are entered. In read mode, the specified record number (4 bytes) is entered. Since the length of the trailing output data 303 changes depending on the access mode, a value based on the access mode must be entered in the Le byte 313 (or 325) of the command APDU for the write/read transfer command. In write mode, the trailing output data 303 has a length of 84h, so the length of DataOut 304 would be 86h. Thus, the Le byte 313 (or 325) is set to 86h. In read mode, the trailing output data 303 has a length of 04h, so the length of DataOut 304 would be 06h. Thus, the Le byte 313 (or 325) is set to 06h.

The format of the command APDU for the write/read transfer command that immediately follows the start of access (i.e., the first command issued) is shown in FIG. 3b. The value of 0000h is entered in the P1 byte 316 and the P2 byte 317. The Le byte 313 is set to 86h for write mode and to 06h for read mode.

The format of the response APDU for the write/read transfer command is shown in FIG. 3a. The application program selected on the IC chip 150 can use the response APDU 300 to request the controller chip 120 for access (write/read) to an active secure data block. This will be referred to as an access execution request. The specifications for the data to be set up in the first control byte 301 and the second control byte 302 will be described. The 4 high-order bits of the first control byte 301 are set to 0010. The 4 low-order bits of the first control byte 301 are set to a code indicating the access to be requested. The code 0001 is for writing record data and 0010 is for reading record data. Other codes are invalid. The access mode indicated by this code must match an access mode acknowledged by the controller chip 120. Also, the second control byte 302 can be used to request the access mode (write/read) for the next time. The controller chip 120 looks this up and switches to an access mode that it acknowledges.

If the 4 high-order bits of the first control byte are 0010, the controller chip 120 performs a write/read operation for data at the specified record number in the active secure data block. If the write/read operation exits normally (0000h for the access result 312 (or 322)), the access mode it acknowledges is switched to the write mode if the second control byte 302 is 01h and to the read mode if the value is 02h. If there is an error in the write/read operation (80XXh for the access result 312 (or 322), the access mode it acknowledges is not switched and the mode active at the time of the error is maintained.

The format of the command APDU for the write/read transfer commands issued after the first one by the controller chip 120 can be as shown in FIG. 3b or FIG. 3c depending on the results of the previous access or the transition between access modes. Also, the value of Le 313 (or 325) changes. The details of this will be described.

If the previous write access was normal and the next command is for write mode, the format in FIG. 3*b* is used, the access results 312 is 0000h, and Le 313 is 86h.

If the previous write access was normal and the next command is for read mode, the format in FIG. 3*b* is used, the access result 312 is 0000h, and Le 313 is 06h.

If the previous read access was normal and the next command is also for read mode, the format in FIG. 3*c* is used, the access result 322 is 0000h, Lc 323 is 80h, the record data that was read is placed in DataIn 324, and Le 325 is 06h.

If the previous read access was normal and the next command is for write mode, the format in FIG. 3*c* is used, the access result 322 is 0000h, Lc 323 is 80h, the record data that was read is placed in DataIn 324, and Le 325 is 86h.

If the previous write access resulted in an error, the format in FIG. 3*b* is used, the access result 312 is 80XXh, and Le 313 is 86h.

If the previous read access resulted in an error, the format in FIG. 3*b* is used, the access result 312 is 80XXh, and Le 313 is 06h.

The XX code entered in the access results 312 (or 322) indicating the nature of an access error will be described.

XX=01 indicates an error where the specified record number is outside the accessible range.

XX=02 indicates an error where the flash memory chip 130 cannot be used due to a malfunction or the like.

XX=03 indicates an error where the 4 low-order bits of the first control byte 301 does not match the current access mode.

XX=04 indicates an error where the next access mode requested by the second control byte 302 is illegal.

Figure 4:
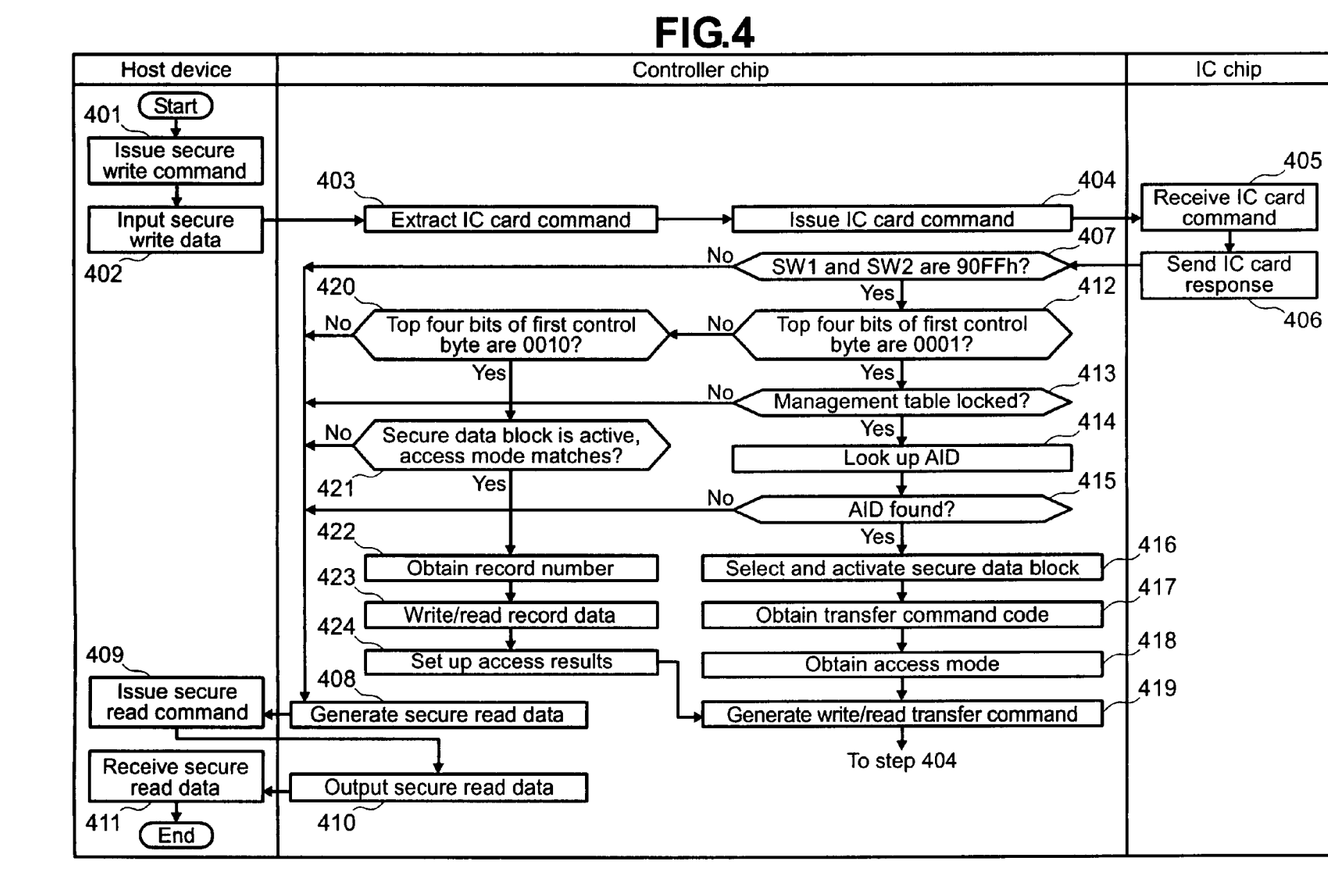
FIG. 4 is a flowchart for performing data reads and writes in a secure data area in a flash memory chip in response to requests from an IC chip.

The flow of operations performed when access to the secure data 133 is started by an application program in the IC chip 150 and the operations performed when access takes place via write/read transfer commands will be described, with reference to FIG. 4.

The host device 160 issues a secure write command to the memory card 110 (410), and the secure write data 601 is received (402). The controller chip 120 extracts the command APDU 602 of the IC card command from the secure write data 601 (403) and uses this to issue the IC card command to the IC chip 150 (404).

The IC chip 150 receives the IC card command (405) and generates and sends back the IC card response 300 requesting access to the secure data area 133 (406). The controller chip 120 receives this response and determines if the SW1 byte 305 and the SW2 byte 306 thereof have a value of 90FFh (407). If the value is not 90FFh, control proceeds to step 408. If the value is 90FFh, the 4 high-order bits of the first control byte 301 are checked to see if they are 0001 (request access initiation) (412). If not, control proceeds to step 420. If the bits are 0001, the management table 136 is checked to see if a lock is active (413). If not, control proceeds to step 408. If there is a lock, the AID field 137 in the management table 136 is searched for the AID in the trailing output data 303 (414). If a matching AID is found (415), the controller chip 120 approves the request to initiate access and control proceeds to step 416. If the AID is not found, the access initiation request is rejected, and control proceeds to step 408. At step 416, the secure data block associated with the found AID 137 is obtained (417). Then, the 4 low-order bits of the first control byte 301 are checked to obtain the access mode to initiate (418). A write/read transfer command is generated according to FIG. 3*b* based on the access mode (419). Control then returns to step 404 and the write/read transfer command is issued to the IC chip 150.

At step 420, the 4 high-order bits of the first control byte 301 are checked to see if they are 0010 (request access execution). If not, control proceeds to step 408. If the bits are 0010, an evaluation is made to determine if there is a secure data block and also if the 4 low-order bits of the first control byte 301 match the access mode recognized by the controller chip 120 (421). If either of these conditions are not met, control proceeds to step 408. If both are true, access execution is approved, and the record number contained in the trailing output data 303 is obtained (422). Then, a write/read is executed with the record number and the specified data (423). If the mode is write mode, the 128 bytes of data contained in the trailing output data 303 are written. Next, the code indicating the access results is entered in the access results 312 or 322 (422). Then, the 4 low-order bits of the first control byte 301 are checked, and the next access mode is obtained (418). Based on this access mode, a write/read transfer command is generated according to FIG. 3*b* or FIG. 3*c* (419). Then, control proceeds to step 404, and the write/read transfer command is issued to the IC chip 150.

At step 408, the secure read data 611 is generated from the response APDU received from the IC chip 150. When step 408 is reached, access to the secure data area 133 is completed. Then, the host device 160 issues a secure read command (409), and the controller chip 120 outputs the secure read data 611 (410). Then, the host device 160 receives the secure read data 611 (411).

These operations allow the secure data area 133 to be accessed any number of times by the application program in the IC chip 150 while a set of secure write/secure read command from the host device 160 is processed by the memory card 110.

Access to the management area 132 will be described.

In order to allow the host device 160 to access the information in the management area 132, the memory card 110 is able to respond to the following four management commands: (1) a register application program command; (2) an unregister application program command; (3) a lock management table command; and (4) an unlock management table command. In (1), an application program that uses the secure data area 133 is registered in the management table 136 and a secure data block to be used by the application program is assigned. In (2), the registration information for an application program is removed from the management table 136, and the assignment of a secure data block is released. In (3), changes to the registration information in the management table 136 are disabled. In (4), changes to the registration information in the management table 136 are allowed. These commands are handled by the controller chip 120 and are implemented through secure write command and secure read command protocols as in standard security operations. The APDU (elements 602 and 612 in FIG. 6) contained in the secure write data and the secure read data are used to pass necessary information back and forth for the different operations (registering, unregistering, locking, and unlocking).

The register application program command and the unregister application program command set an AID in the DataIn 606. This AID is used to indicate the application program to be registered. The controller chip 120 determines how the AID is associated with a secure data block. The host device 160 cannot directly specify a secure data block.

The lock management table command sets up a 255-byte password in the DataIn 606. This password is entered in the password area 135, and the lock flag 134 is set to FFh (locked state). As a result, the register application program command and the unregister application program command are disabled. If the locked state was already enabled, the password is not entered in the password area 135 and the register application program command and the unregister application program command remain enabled.

The unlock management table command sets up a 255-byte password in DataIn. The password is compared with the value entered in the password area 135, and the lock flag 134 is set to 00h (unlocked state) if the password matches. As a result, the register application program and the unregister application command are enabled. If the unlocked state was already enabled, the register application program command and the unregister application program command stay disabled.

When the register application program command and the unregister application program command are enabled (unlocked state), a host device 160 that does not know the password could be used to improperly change the information in the host device 160, allowing an application program to improperly perform write/read operations on a security data block other than the one it can access. Therefore, the controller chip 120 does not allow access by a selected application program in the IC chip 150 if the lock flag 134 has a value of 00h (unlocked state). After registration information in the management table 136 is set/changed, the host device 160 must always use the management table lock command to set the lock flag 134 to FFh.

Figure 5:
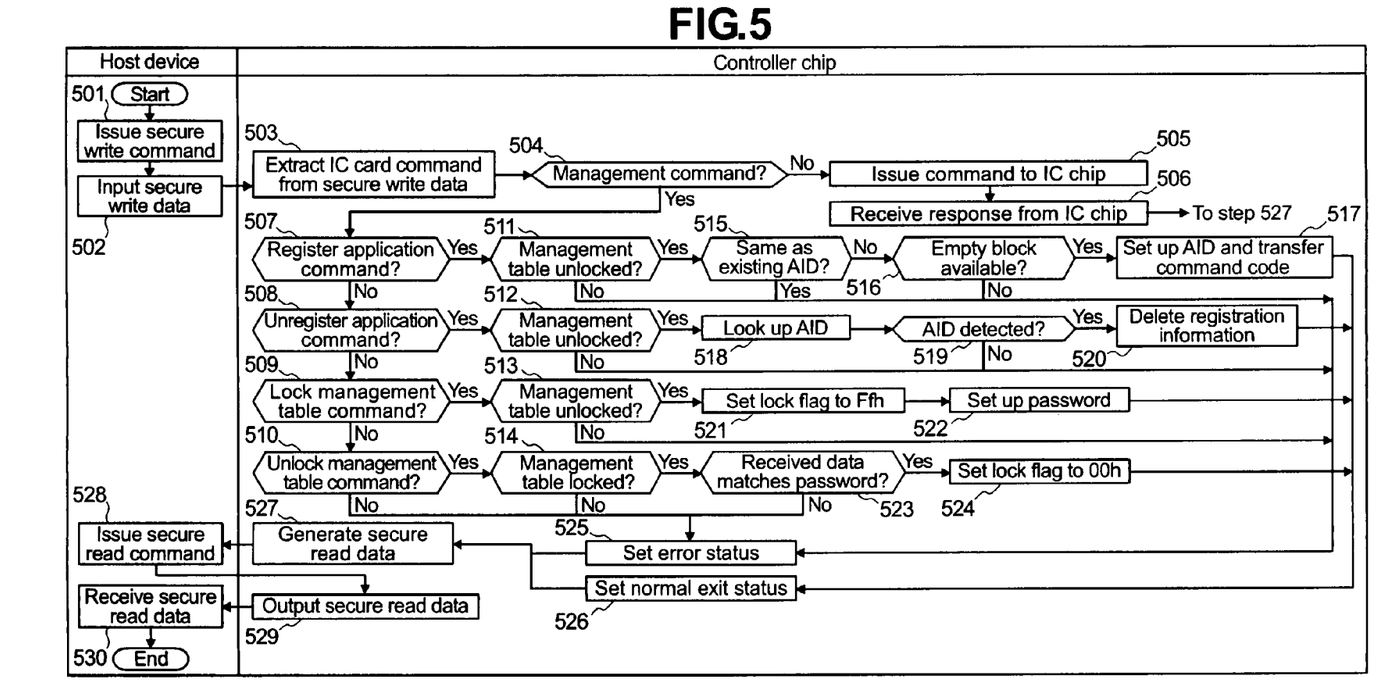
FIG. 5 is a flowchart of operations performed in response to requests from an IC chip for registering and unregistering application programs in a management memory in a flash memory chip as well as locking and unlocking of registration information.

The flow of operations performed in the four management commands will be described, with references to FIG. 5.

The host device 160 issues a secure write command to the memory card 110 (501), and the secure write data 601 is received (502). The controller chip 120 extracts the command APDU 602 for the IC card command from the secure write data 601 (503) and determines if it is a management command (504). If so, control proceeds to step 507. Otherwise, the command APDU 602 is used to issue the IC card command to the IC chip 150 (505). The response from the IC chip 150 is received (506), and control proceeds to step 527.

At step 507, the controller chip 120 determines if the command APDU 602 indicates a register application program command. If the command is a register application program command, control proceeds to step 511. Otherwise, the command is checked to see if it is an unregister application program command (508). If so, control proceeds to step 512. Otherwise, the command is checked to see if it indicates a lock management table command (509). If so, control proceeds to step 513. Otherwise, the command is checked to see if it is an unlock management table command (510). If so, control proceeds to step 514. Otherwise, control proceeds to step 525.

At step 511, the lock flag 134 is checked to determine if the management table 136 is unlocked. If not, control proceeds to step 525. If the table is unlocked, the AID fields 137 are checked to see if the AID in the DataIn 606 is already registered (515). If so, control proceeds to step 525. Otherwise, the management table 136 is checked to see if there is an availability (i.e., if there is a security data block that has not yet been assigned) (516). If there is no availability, control proceeds to step 525. If there is an availability, the AID and transfer command code from the DataIn 606 are entered in the AID field 137 and the transfer command code 138 for the secure data block (517). This allows the application program indicated by the AID to obtain usage privileges for the secure data block. Control then proceeds to step 526.

At step 512, the lock flag 134 is checked and the management table 136 is checked to see if it is unlocked. If the table is locked, control proceeds to step 525. If the table is unlocked, all the registered AID fields 137 are checked to see if the AID in the DataIn 606 is registered (518). If a matching AID is found (519), the AID field 137 and the associated transfer command code 138 are removed from the management table 136 (520). If no matching AID is found, control proceeds to step 525. Upon removal of the matching AID field 137 and the associated transfer command code 138, the application program indicated by the AID loses usage privileges for its secure data block. Control then proceeds to step 526.

At step 513, the lock flag 134 is checked to determine if the management table 136 is unlocked. If the table is locked, control proceeds to step 525. If the table is unlocked, the lock flag 134 is set to FFh (521) to lock the management table 136. The password in the DataIn 606 is entered in the password area 135 (522). Control then proceeds to step 526.

At step 514, the lock flag 134 is checked to see if the management table 136 is unlocked. If the table is unlocked, control proceeds to step 525. If the table is locked, the password in the DataIn 606 is checked to see if it matches what is in the password area 135 (523). If there is no match, control proceeds to step 525. If the password matches, the lock flag 134 is set to 00h (524), and the management table 136 is unlocked. Control then proceeds to step 526.

At step 525, in order to indicate to the host device 160 that an error took place when processing a management command, a response APDU 612 containing the status code indicating the nature of the error is generated. Control then proceeds to step 527. At step 526, in order to indicate to the host device 160 that the management command was processed normally, a response APDU 612 containing a status code indicating successful completion (e.g., 9000h) is generated, and control proceeds to step 527.

At step 527, the secure read data 611 is generated from the response APDU 612. Then, the host device 160 issues a secure read command (528), and the controller chip 120 outputs the secure read data 611 (529). Then, the host device 160 receives the secure read data 611 (530).

In this implementation of the present invention, the request to access the secure data area 133 from the IC chip 150 to the controller chip 120 involves setting the dedicated status value of 90FFh in the SW1 byte 305 and the SW2 byte 306, but this is just one example and access requests can be made using other ways. For example, a status code other than 90FFh can be used or a dedicated password or the like can be included in the DataOut 304.

Furthermore, the present invention can be implemented so that the memory card 110 can change the size of the secure data area 133 in response to a new management command (or one of the aforementioned management commands). Also, a feature for changing the number of divisions in the secure data block (there are four divisions in the example described above) in response to a new (or aforementioned) management command can be provided. Further, a feature for changing individual secure data block sizes in response to a new (or aforementioned) management command can be provided. In addition, the present invention does not need to be implemented with a password length of 255 bytes as described above. However, longer passwords offer more safety.

When implementing the present invention, there is the possibility that sensitive data associated with an application program that was using a secure data block subsequently released by the unregister application program command can be left behind so that the next application program that obtains usage privileges for the block could obtain the sensitive data. Therefore, for the purpose of safety, it would be preferable to erase data left over after unregistration. This erasing operation can be performed during the processing of the unregister application program command or can be performed by the memory card 110 in response to a new management command from the host device 160. Moreover, the present invention can also be implemented for storage devices other than card-type storage devices.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. A memory device comprising:
   an interface which interfaces with an external device;
   an IC chip which comprises an EEPROM for storing a plurality of application programs and a CPU for executing said application programs;
   a nonvolatile memory which stores associated data associated with said one or more application programs; and
   a controller connected with said interface, said IC chip, and said nonvolatile memory;
   wherein said IC chip, said nonvolatile memory and said controller are comprised of separate chips;
   wherein said controller, in response to a predetermined command received from said external device by way of said interface, performs transfer of said associated data between said IC chip and said nonvolatile memory without passing said associated data to a host device during transfer of said associated data between said IC chip and said nonvolatile memory;
   wherein:
   said nonvolatile memory is divided into a plurality of blocks; and
   each of said plurality of blocks to be assigned to an application program to store said associated data associated with said assigned application program; and
   wherein said nonvolatile memory includes a management area to store an application ID used to identify each one of said application programs and an operation code used to transfer said associated data associated with said one application program between said nonvolatile memory and said IC chip through said controller.

2. A memory device as recited in claim 1 wherein said nonvolatile memory is controllable to operate in a locked mode to disable changing and adding and deleting an application ID in said nonvolatile memory associated with an application program stored in said IC chip when at least one application program is stored in said IC chip, and an unlocked mode to permit changing and adding and deleting an application ID in said nonvolatile memory.

3. A memory device as recited in claim 1 wherein said IC chip transfers an application ID in said IC chip, and wherein said controller compares said application ID from said IC chip with an application ID from said nonvolatile memory, and, if there is a match between said application ID from said IC chip and said application ID from said nonvolatile memory, allows transfer of said associated data associated with said application program identified by said application ID between said IC chip and said nonvolatile memory.

4. A memory device as recited in claim 1 wherein said operation code is unique to said application ID associated with said operation code.

5. A memory device as recited in claim 1 wherein said associated data is already stored in said nonvolatile memory when said memory device is first used.

6. A memory device as recited in claim 1 wherein said controller which performs transfer of associated data associated with an application program between said IC chip and said nonvolatile memory, in response to said predetermined command, by a transfer command associated with said application program sent from said nonvolatile memory to said IC chip.

7. A memory device as recited in claim 1, wherein said nonvolatile memory further includes a secure area and a normal area, wherein said secure area is divided into a plurality of blocks, wherein each block is assigned to each application program and stores associated data with each application program, and wherein said normal area stores data from said external device.

8. A memory device as recited in claim 7 wherein said controller sends said operation code to said IC chip, to transfer to said IC chip said associated data which was read from said secure area or to request from said IC chip said associated data which is to be written into said secure area.

9. A memory device as recited in claim 1, wherein said controller individually generates said operation code for each application program when said controller assigns said block to said application program.

10. A memory device comprising:
    an IC chip which comprises an EEPROM for storing a plurality of application programs and a CPU for executing application programs;
    a nonvolatile memory divided into a plurality of blocks, each block to be assigned to an application program executed by said IC chip; and
    a controller controlling access to said nonvolatile memory and said IC chip;
    wherein said IC chip, said nonvolatile memory and said controller are comprised of separate chips;
    wherein said nonvolatile memory stores one or more command codes used to allow said controller to query said IC chip regarding an instruction to perform an operation, said instruction being issued by said IC chip to said controller, each command code being associated with an application ID for identifying an application program;
    wherein, in response to an application ID associated with an application program, said application ID in IC chip being sent to said controller by said IC chip which executes said application program of said application ID, said controller identifies, out of said one or more command codes stored in said nonvolatile memory, a command code associated with said application ID from said IC chip, and sends said identified command code to said IC chip; and
    wherein, in response to an instruction to perform an operation issued by said IC chip to said controller based on said identified command code, said controller performs said operation.

11. A memory device as recited in claim 10 wherein said command code includes a first transfer command for transferring data to be written to a block in said nonvolatile memory from said IC chip to said controller and a second transfer command for transferring data read from a block in said nonvolatile memory by said controller to said IC chip.

12. A memory device as recited in claim 11 wherein said IC chip sends the application ID to said controller in response to an IC command for executing said application program from the controller, wherein the IC command is extracted from an external command received by the controller, and wherein the external command differs from the first transfer command and the second transfer command of the command code.

13. A memory device as recited in claim 11 wherein the instruction to perform an operation issued by said IC chip specifies which of the first transfer command and the second transfer command is to be performed.

14. A memory device as recited in claim 10 wherein said IC chip sends to said controller output data including a first control byte, a second control byte, and trailing output according to format of the ISO 7816 specifications, and wherein both said application ID and said instruction to perform an operation from said IC chip is sent as said trailing data.

15. A memory device as recited in claim 14 wherein said output data further comprises at least one status word byte.

16. A memory device comprising:
an IC chip which comprises an EEPROM for storing a plurality of application programs and a CPU for executing application programs;
a nonvolatile memory divided into a plurality of blocks, each block to be assigned to an application program executed by said IC chip;
a controller controlling access to said nonvolatile memory and said IC chip;
wherein said IC chip, said nonvolatile memory and said controller are comprised of separate chips;
wherein said controller, in response to a first command from an external device, assigns a usage privilege for a block in said nonvolatile memory to a particular application program to be executed by said IC chip; and, in response to a second command from the external device, changes from an unlocked state allowing execution of an operation in response to said first command to a locked state disallowing execution of said operation in response to said first command;
wherein said nonvolatile memory includes a first area for storing data received from said external device and a second area comprising said blocks for which usage privilege is assigned for said application programs; and
wherein said controller generates, for each application program, transfer command codes for identifying transfer commands for receiving data read from said second area of said nonvolatile memory from said IC chip and for sending data to be written to said second area to said IC chip.

17. A memory device as recited in claim 16 wherein:
said nonvolatile memory stores management information used to manage associations between identifiers for said blocks and identifiers for application programs for which usage privilege has been assigned for said blocks;
said controller allows contents of said management information to be changed in said unlocked state; and
said controller disallows contents of said management information to be changed in said locked state.

18. A memory device as recited in claim 16 wherein:
said nonvolatile memory stores management information used to manage associations between identifiers for said blocks and identifiers for application programs for which usage privilege has been assigned for said blocks; and
said controller, when said usage privilege for a block is assigned to an application program, adds an identifier for said application program associated with an identifier for said block to said management information.

19. A memory device as recited in claim 16 wherein:
said nonvolatile memory stores a flag for identifying whether execution of said operation in response to said first command is allowed or disallowed; and
said controller changes said flag when changing from said unlocked state to said locked state in response to said second command.

20. A memory device as recited in claim 16 wherein said controller changes from said locked state to said unlocked state in response to a third command from said external device.

21. A memory device as recited in claim 20 wherein:
said nonvolatile memory stores a reference password; and
said controller changes from said locked state to said unlocked state in response to said third command if a password received from said external device matches said reference password in said nonvolatile memory.

22. A memory device as recited in claim 16 wherein said controller disables usage privilege for a block assigned for an application program in response to a fourth command from said external device.

23. A memory device as recited in claim 22 wherein:
said nonvolatile memory stores management information used to manage associations between identifiers for said blocks and identifiers for application programs for which usage privilege has been assigned for said blocks; and
said controller removes from said management information an identifier for said application program associated with an identifier for said block when disabling usage privilege for said block assigned for said application program.

24. A memory device as recited in claim 16 wherein said transfer command codes are unique to each application program.

* * * * *